(12) United States Patent
Conyers et al.

(10) Patent No.: US 7,640,019 B2
(45) Date of Patent: Dec. 29, 2009

(54) DYNAMIC REALLOCATION OF BANDWIDTH AND MODULATION PROTOCOLS

(75) Inventors: David J. Conyers, Minneapolis, MN (US); Jeffrey J. Cannon, St. Louis Park, MN (US); Larry G. Fischer, Waseca, MN (US); Douglas D. Weaver, Plymouth, MN (US); Santosh K. Sonbarse, Eden Prairie, MN (US); William J. Mitchell, Eden Prairie, MN (US); Michael J. Hermel, Waseca, MN (US); Donald R. Bauman, Waseca, MN (US); Jerry E. Toms, Shakopee, MN (US); Philip M. Wala, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 626 days.

(21) Appl. No.: 11/094,947

(22) Filed: Mar. 31, 2005

(65) Prior Publication Data
US 2006/0227736 A1    Oct. 12, 2006

(51) Int. Cl.
 *H04Q 7/20* (2006.01)
 *H04B 7/212* (2006.01)
(52) U.S. Cl. .................. 455/452.2; 455/561; 455/452.1; 455/450; 455/511; 370/321; 370/324; 370/347; 370/350
(58) Field of Classification Search .............. 455/452.2, 455/452.1, 450, 552.1, 557, 118, 313, 561, 455/511; 370/329, 341, 252, 310, 324
See application file for complete search history.

(56) References Cited

U.S. PATENT DOCUMENTS

| 4,569,042 A | 2/1986 | Larson |
| 5,184,347 A | 2/1993 | Farwell et al. |
| 5,276,691 A | 1/1994 | Kivari |

(Continued)

FOREIGN PATENT DOCUMENTS

EP         0936453         8/1999

(Continued)

OTHER PUBLICATIONS

U.S. Appl. No. 11/095,628, Toms et al.

(Continued)

*Primary Examiner*—Huy Q Phan
(74) *Attorney, Agent, or Firm*—Fogg & Powers LLC (57) ABSTRACT

A communications system dynamically reconfigurable for RF bandwidth and modulation protocols is disclosed. A server comprises one or more radio head interface modules and a call processing software module adapted to communicate with each other. The call processing software is adapted to perform modulation and demodulation of voice and data streams using one or more air interface protocols. A radio head unit coupled to the radio head interface module communicates with one or more subscriber units. The radio head interface module receives either air interface protocol configuration information, or RF signal bandwidth allocation information, from the call processing software module for one or more communication channels, the information providing a timing trigger and a protocol or bandwidth for one or more communication channels. The radio head interface module reconfigures itself for one or more communications channels, based on the change instructed by the call processing software.

15 Claims, 5 Drawing Sheets

U.S. PATENT DOCUMENTS

| | | | |
|---|---|---|---|
| 5,544,222 | A | 8/1996 | Robinson et al. |
| 5,619,504 | A | 4/1997 | Van Grinsven et al. |
| 5,649,000 | A | 7/1997 | Lee et al. |
| 5,701,294 | A | 12/1997 | Ward et al. |
| 5,854,978 | A | 12/1998 | Heidari |
| 5,881,063 | A | 3/1999 | Bement et al. |
| 5,970,069 | A | 10/1999 | Kumar et al. |
| 5,978,688 | A | 11/1999 | Mullins et al. |
| 6,021,446 | A | 2/2000 | Gentry, Jr. |
| 6,047,002 | A | 4/2000 | Hartmann et al. |
| 6,091,765 | A | 7/2000 | Pietzold, III et al. |
| 6,097,733 | A * | 8/2000 | Basu et al. ............... 370/468 |
| 6,188,898 | B1 | 2/2001 | Phillips |
| 6,219,561 | B1 | 4/2001 | Raleigh |
| 6,233,456 | B1 | 5/2001 | Schiff et al. |
| 6,363,421 | B2 | 3/2002 | Barker et al. |
| 6,381,289 | B1 * | 4/2002 | Dutta ...................... 375/335 |
| 6,434,366 | B1 | 8/2002 | Harrison et al. |
| 6,463,060 | B1 | 10/2002 | Sato et al. |
| 6,496,546 | B1 | 12/2002 | Allpress et al. |
| 6,501,785 | B1 | 12/2002 | Chang et al. |
| 6,544,428 | B1 | 4/2003 | Higashi |
| 6,584,146 | B2 | 6/2003 | Bose et al. |
| 6,636,747 | B2 | 10/2003 | Harada et al. |
| 6,715,007 | B1 | 3/2004 | Williams et al. |
| 6,728,228 | B1 | 4/2004 | Ostman et al. |
| 6,751,187 | B2 | 6/2004 | Walton et al. |
| 6,760,882 | B1 | 7/2004 | Gesbert et al. |
| 6,775,303 | B1 | 8/2004 | Rustad et al. |
| 6,775,305 | B1 | 8/2004 | Delvaux |
| 6,788,961 | B2 | 9/2004 | Repice et al. |
| 6,810,270 | B1 | 10/2004 | Grohn et al. |
| 6,829,229 | B1 | 12/2004 | Palermo et al. |
| 6,876,864 | B1 | 4/2005 | Chapin |
| 6,882,851 | B2 | 4/2005 | Sugar et al. |
| 6,889,354 | B2 | 5/2005 | Feldman et al. |
| 6,912,228 | B1 | 6/2005 | Dahlman et al. |
| 6,931,074 | B1 | 8/2005 | Palermo et al. |
| 6,944,449 | B1 | 9/2005 | Gandhi et al. |
| 6,957,086 | B2 | 10/2005 | Bahl et al. |
| 6,977,930 | B1 | 12/2005 | Epps et al. |
| 7,016,668 | B2 | 3/2006 | Vaidyanathan et al. |
| 7,035,932 | B1 | 4/2006 | Dowling |
| 7,058,789 | B2 | 6/2006 | Henderson et al. |
| 7,069,574 | B1 | 6/2006 | Adams et al. |
| 7,072,413 | B2 | 7/2006 | Walton et al. |
| 7,099,687 | B1 | 8/2006 | Makela et al. |
| 7,103,044 | B1 | 9/2006 | Keller et al. |
| 7,116,682 | B1 * | 10/2006 | Waclawsky et al. ......... 370/468 |
| 7,151,925 | B2 | 12/2006 | Ting et al. |
| 7,190,682 | B2 | 3/2007 | Shepherd et al. |
| 7,191,262 | B2 | 3/2007 | Sleeman |
| 7,203,488 | B2 | 4/2007 | Luneau |
| 7,269,200 | B2 | 9/2007 | Igarashi |
| 7,315,571 | B1 | 1/2008 | Heidari et al. |
| 7,324,786 | B2 | 1/2008 | Parker |
| 7,386,641 | B2 | 6/2008 | Xu et al. |
| 7,398,106 | B2 * | 7/2008 | Conyers et al. ............. 455/557 |
| 7,423,988 | B2 * | 9/2008 | Hedin et al. ............... 370/322 |
| 2001/0024430 | A1 | 9/2001 | Sekine et al. |
| 2001/0031621 | A1 | 10/2001 | Schmutz |
| 2001/0037395 | A1 | 11/2001 | Sabat, Jr. et al. |
| 2002/0001337 | A1 | 1/2002 | Chauncey et al. |
| 2002/0035633 | A1 | 3/2002 | Bose et al. |
| 2002/0056066 | A1 | 5/2002 | Gesbert et al. |
| 2002/0078247 | A1 | 6/2002 | Lu et al. |
| 2002/0093983 | A1 * | 7/2002 | Newberg et al. ............ 370/468 |
| 2002/0169894 | A1 | 11/2002 | Takla |
| 2002/0186436 | A1 | 12/2002 | Mani et al. |
| 2002/0186674 | A1 | 12/2002 | Mani et al. |
| 2002/0187809 | A1 | 12/2002 | Mani et al. |
| 2002/0191565 | A1 | 12/2002 | Mani et al. |
| 2003/0003880 | A1 | 1/2003 | Ling et al. |
| 2003/0016701 | A1 | 1/2003 | Hinson |
| 2003/0036359 | A1 | 2/2003 | Dent et al. |
| 2003/0050098 | A1 | 3/2003 | D'Agati et al. |
| 2003/0125040 | A1 | 7/2003 | Walton et al. |
| 2003/0142649 | A1 * | 7/2003 | Taniguchi .................. 370/336 |
| 2004/0001429 | A1 | 1/2004 | Ma et al. |
| 2004/0005866 | A1 | 1/2004 | Igarashi |
| 2004/0033806 | A1 * | 2/2004 | Daniel et al. ............... 455/450 |
| 2004/0042387 | A1 | 3/2004 | Geile |
| 2004/0046016 | A1 | 3/2004 | Becker et al. |
| 2004/0132477 | A1 | 7/2004 | Lundby et al. |
| 2004/0156328 | A1 | 8/2004 | Walton et al. |
| 2004/0156449 | A1 | 8/2004 | Bose et al. |
| 2004/0198410 | A1 | 10/2004 | Shepherd et al. |
| 2004/0198453 | A1 | 10/2004 | Cutrer et al. |
| 2004/0209580 | A1 | 10/2004 | Bose et al. |
| 2005/0002444 | A1 | 1/2005 | Wei et al. |
| 2005/0033519 | A1 | 2/2005 | Fenton |
| 2005/0041746 | A1 | 2/2005 | Rosen et al. |
| 2005/0083876 | A1 | 4/2005 | Vialen et al. |
| 2005/0138383 | A1 | 6/2005 | Vainstein |
| 2005/0147024 | A1 | 7/2005 | Jung et al. |
| 2005/0190855 | A1 | 9/2005 | Jin et al. |
| 2005/0280564 | A1 | 12/2005 | Lee |
| 2006/0015674 | A1 | 1/2006 | Murotake |
| 2006/0034242 | A1 * | 2/2006 | Proctor, Jr. ................. 370/342 |
| 2006/0141957 | A1 | 6/2006 | Fischer et al. |
| 2006/0206628 | A1 | 9/2006 | Erez |
| 2006/0222054 | A1 | 10/2006 | Conyers et al. |
| 2006/0227736 | A1 | 10/2006 | Conyers et al. |
| 2007/0032241 | A1 | 2/2007 | Busch et al. |
| 2008/0025211 | A1 | 1/2008 | Karaoguz et al. |
| 2008/0137575 | A1 | 6/2008 | Conyers et al. |

FOREIGN PATENT DOCUMENTS

| | | |
|---|---|---|
| EP | 1211817 | 6/2002 |
| WO | 0159993 | 8/2001 |
| WO | 2004047316 | 6/2004 |

OTHER PUBLICATIONS

U.S. Appl. No. 11/095,789, Hedin et al.
U.S. Appl. No. 11/094, 848, Weaver et al.
U.S. Appl. No. 11/095,111, Hermel et al.
U.S. Appl. No. 11/095,112, Hedin et al.
U.S. Appl. No. 11/094,949, Hedin et al.
U.S. Appl. No. 11/095,113, Hedin et al.
U.S. Appl. No. 11/094,950, Hedin et al.
U.S. Appl. No. 11/095,788, Conyers et al.
U.S. Appl. No. 11/094,907, Conyers et al.
U.S. Appl. No. 11/095,150, Bauman et al.
U.S. Appl. No. 11/095,779, Hermel et al.

* cited by examiner

DYNAMIC REALLOCATION OF BANDWIDTH AND MODULATION PROTOCOLS

CROSS REFERENCES TO RELATED APPLICATIONS

This application is related to the following co-pending United States patent applications filed on Mar. 31, 2005, all of which are hereby incorporated herein by reference:

U.S. patent application Ser. No. 11/095,788 entitled "DYNAMIC FREQUENCY HOPPING";

U.S. patent application Ser. No. 11/095,628 entitled "DYNAMIC DIGITAL UP AND DOWN CONVERTERS";

U.S. patent application Ser. No. 11/095,789 entitled "DYNAMIC RECONFIGURATION OF RESOURCES THROUGH PAGE HEADERS";

U.S. patent application Ser. No. 11/094,848 entitled "SIGNAL ENHANCEMENT THROUGH DIVERSITY";

U.S. patent application Ser. No. 11/095,111 entitled "SNMP MANAGEMENT IN A SOFTWARE DEFINED RADIO";

U.S. patent application Ser. No. 11/095,112 entitled "TIME STAMP IN THE REVERSE PATH";

U.S. patent application Ser. No. 11/094,949 entitled "BUFFERS HANDLING MULTIPLE PROTOCOLS";

U.S. patent application Ser. No. 11/095,113 entitled "TIME START IN THE FORWARD PATH";

U.S. patent application Ser. No. 11/094,950 entitled "LOSS OF PAGE SYNCHRONIZATION";

U.S. patent application Ser. No. 11/094,907 entitled "DYNAMIC READJUSTMENT OF POWER"; and which is referred to U.S. patent application Ser. No. 11/095,150 entitled "METHODS AND SYSTEMS FOR HANDLING UNDERFLOW AND OVERFLOW IN A SOFTWARE DEFINED RADIO"; and U.S. patent application Ser. No. 11/095,779 entitled "INTEGRATED NETWORK MANAGEMENT OF A SOFTWARE DEFINED RADIO SYSTEM".

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards. Current mobile communication standards introduce physical and logical channels and pose new issues in the transport of information within the communication networks.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

One problem with current mobile communication standards is the number of distinct modulation standards that may be in use within a geographic region and the ability for wireless communication network providers to adapt their network hardware for the various protocols. Current modulation standards that a wireless communication network may operate with includes, but is not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM). Purchasing hardware designed to operate with only a single standard results in idle resources at times when network demand for that modulation standard is low. To avoid the expenses associated with operating and maintaining hardware dedicated to each standard, there is a need in the art today for communications network hardware that is modulation standard independent and can be dynamically reconfigured to support modulation standards based on the current demands on the network and operate with multiple standards simultaneously.

Another problem is that wireless communication transmissions are no longer limited to voice data, but now carry a spectrum of data from text messaging to real time streaming video from the Internet. Communications such as streaming video require significantly more bandwidth than transmitting a text message. However, when a logical channel is configured to support wide bandwidth communication data, available bandwidth is wasted when that same channel is used to carry lower bandwidth communications data (e.g. a short text message). There is a need in the art today for communication network hardware which has the ability to dynamically allocate radio bandwidth based on the type of data being transmitted.

For the reasons stated above, and for other reasons stated below that will become apparent to those skilled in the art upon reading and understanding the present specification, there is a need in the telecommunications industry for solutions for implementing dynamic protocol reconfiguration and dynamic bandwidth reallocation for software defined radios.

SUMMARY

Embodiments of the present invention address the problem of frequency coordination of base station components and mobile devices implementing dynamic protocol reconfiguration and dynamic bandwidth reallocation, as well as other problems and will be understood by reading and studying the following specification.

In one embodiment, a communications system is provided. A server comprises one or more radio head interface modules and a call processing software module. The radio head interface modules are adapted to communicate with the call processing software module. The call processing software is adapted to perform modulation and demodulation of voice and data streams using one or more air interface protocols. A radio head unit is coupled to the radio head interface module over one or more transport mediums and communicates with one or more subscriber units using the one or more air interface protocols. The radio head interface module receives air interface protocol parameters from the call processing software module for one or more communication channels. The radio head interface module reconfigures itself for one or more communications channels, based on the air interface protocol configuration information.

In another embodiment, another communications system is provided. A server comprises one or more radio head interface modules and a call processing software module. The radio head interface modules are adapted to communicate with the call processing software module. The call processing software is adapted to perform modulation and demodulation of voice and data streams using one or more air interface protocols. A radio head unit is coupled to the radio head interface module over one or more transport mediums and communicates with one or more subscriber units using the one or more air interface protocols. The radio head interface module receives bandwidth allocation information from the call processing software module for one or more communication channels, the information providing a timing trigger and signal bandwidth allocation parameters for one or more communication channels. The radio head interface module reconfigures itself for one or more communications channels, based on the bandwidth reallocation information.

In yet another embodiment, a method for dynamic protocol configuration for a communications network logical channel is provided. The method comprises receiving protocol configuration parameters indicating a desired protocol configuration and a designated trigger event; determining digital frequency converter parameters for the desired protocol configuration; and reconfiguring a digital frequency converter with the parameters upon occurrence of the designated trigger event.

In yet another embodiment, a method for dynamic signal bandwidth allocation for a communications network logical channel is provided. The method comprises receiving signal bandwidth allocation parameters indicating a desired signal bandwidth allocation and a designated trigger event; determining digital frequency converter parameters for the desired signal bandwidth allocation; and reconfiguring a digital frequency converter with the parameters upon occurrence of the designated trigger event.

DRAWINGS

The present invention is more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems to implement a bandwidth allocation and protocol selection function for mobile communications systems.

Embodiments of the present invention concern portions of a cellular telecommunications network that typically comprises one or more cellular antennas, a remote unit (also called a radio head) transmitting and receiving voice and/or data communications over the cellular antennas, and a base station (also commonly called a base transceiver station (BTS), or a server) that communicates data between the remote unit and a larger communication network (e.g. the public switched telephone network, or the Internet).

In some embodiments, communications between a BTS and a remote unit take place through two sets of data streams. Typically, forward logical channels carry data from the BTS through the radio head to an end user device. Reverse logical channels carry data from end user devices through the radio head to the BTS. Each logical channel is assigned a radio frequency (RF) channel and a modulation protocol, which the communications network uses to wirelessly communicate data with individual cellular devices. Embodiments of the present invention provide methods and systems for reconfiguring the modulation protocol and signal bandwidth allocation used by SDR logical channels. Details pertaining to reconfiguring the radio frequency used by a SDR logical channel are provided in the '672 application herein incorporated by reference.

Figure 1A:
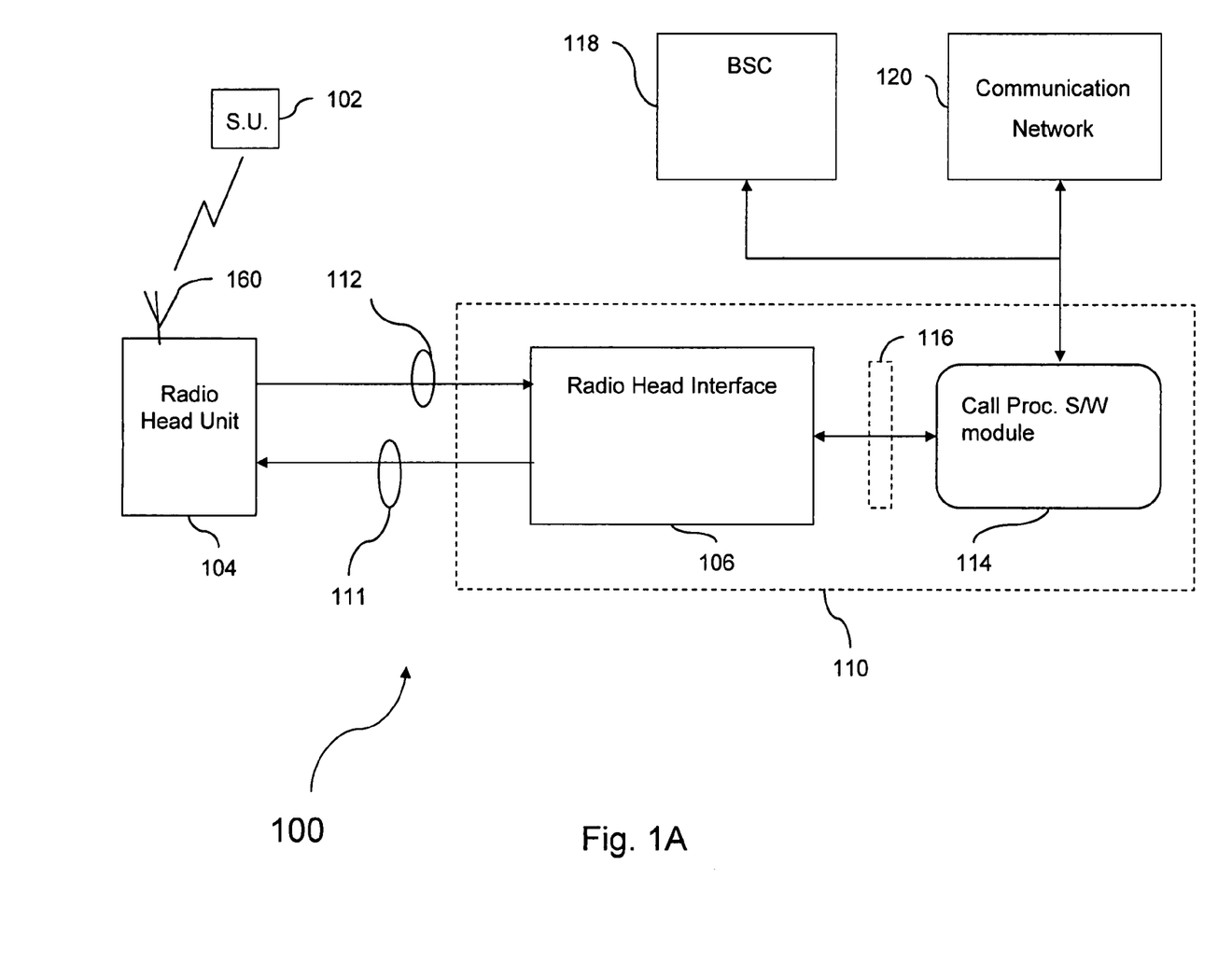
FIGS. 1A, 1B and 1C are illustrations of a communications system of one embodiment of the present invention.

FIG. 1A is a block diagram of one embodiment of a communication system shown generally at 100. Communication system 100 includes one or more subscriber units 102 (or mobile devices 102) within a service area of a radio head unit 104. Radio head unit 104 is coupled to one or more servers 110 (or BTS 110) over one or more transport mediums 111, and 112. In one embodiment, transport mediums 111 and 112 comprise one or more high speed transport mediums. BTS 110 is connected to one or more communication networks 120 (e.g. public switched telephone network (PSTN), Internet, a cable network, or the like). In one embodiment, BTS 110 is connected to one or more communications networks through a base station controller (BSC) 118. One or more cellular antennas 160, adapted for receiving cellular signals from one or more subscriber units 102, are coupled to radio head unit 104. In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided that duplicate the reverse logical channels. In some embodiments, this set of duplicate reverse logical channels are called diversity channels. It should be understood that descriptions in this specification relating to embodiments of reverse logical channels also apply to such diversity channels. Further details pertaining to the advantages and operation of diversity channels are provided in the '676 application incorporated herein by reference.

BTS 110 includes a call processing software module 114 (or call processing software 114) that interfaces with one or more communication networks 120. In one embodiment, call processing software module 114 is comprised of one or more software applications. Call processing software module 114 also includes programming which implements an SDR with the BTS 110 and radio head unit 104 hardware, digitally performing waveform processing to modulate and demodulate radio signals transmitted and received, respectively, from the cellular antennas 160. In one embodiment, call processing software module 114 is a Vanu, Inc., Vanu Software Radio.

In one embodiment, BTS 110 communicates with radio head unit 104 through radio head interface module 106 (or radio head interface 106). In one embodiment, BTS 110 comprises a general purpose computer adapted with one or more cards functioning as radio head interface module 106. Radio head interface module 106 establishes high speed digital communication paths for two or more sets of base band data stream logical channels and all communication between BTS 110 and radio head unit 104 goes through radio head interface 106. In another embodiment, BTS 110 comprises a specialized computing device that may include, but is not limited to, a digital signal processor.

Radio head interface module 106, radio head unit 104, and call processing software module 114, all handle multiple types of modulation protocols, and in different embodiments, one or more of the logical channels transmit data using a different modulation protocol than another logical channel. In one embodiment, radio head interface module 106, radio head unit 104, and call processing software module 114, handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. For each logical channel, call processing software module 114 performs modulation and demodulation of forward and reverse logical channel voice and data streams using one or more of the air interface standard protocols. In one embodiment, the forward and reverse logical channel data streams carry complex RF data samples representing voice and data communications. Some modulation protocols operate on multiple bands. For example, the GSM protocol can be implemented in the 850 MHz, 900 MHz, 1.8 GHz or 1.9 GHz bands. For such modulation protocols, each logical channel is configured to implement one communications protocol within a specific bandwidth.

In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface. During initial configuration of communication system 100, digital up-converter (DUC) and digital down-converter (DDC) parameters are loaded into radio head interface 106 for one or more of the protocols supported by radio head unit 104. Such parameters include, but are not limited to, filter coefficients, NCO frequencies, and sampling rates necessary to support valid RF channel, signal bandwidth, signal gain, and protocol configurations. Additional details regarding the parameters, configuration and operation of DUCs and DDCs are discussed in the '673 and '677 applications, incorporated herein by reference. In one embodiment, the parameters are stored in a table in memory 136 in radio head interface 106.

Embodiments of the present invention enable radio head interface 106 to dynamically reconfigure a logical channel in order to optimize the use of all available logical channels given current demands for various supported protocols and bandwidth allocations.

Figure 1B:
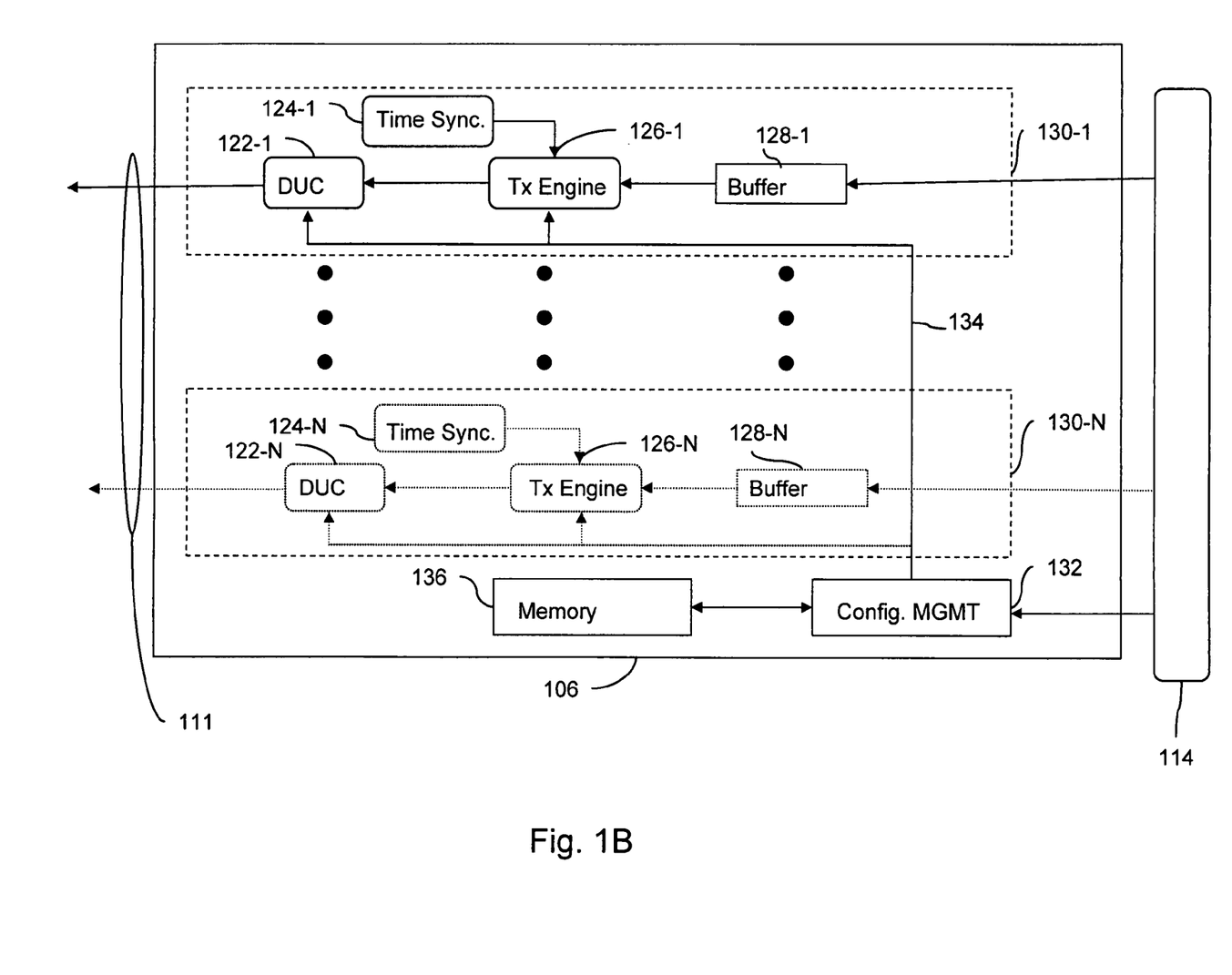

FIG. 1B illustrates one embodiment of a forward logical channel 130-1 data path. A radio head interface forward logical channel comprises a transmit buffer 128-1, a transmit engine 126-1, a DUC 122-1 and a time synchronizer 124-1. In one embodiment, radio head interface card 106 comprises a plurality of M forward logical channels 130-1 through 130-M each having transmit buffers 128-1 through 126-M, transmit engines 126-1 through 126-M, DUCs 122-1 through 122-M and time synchronizers 124-1 through 124-M.

In one embodiment, radio head interface 106 is dynamically reconfigured to change modulation protocol for forward logical channel 130-1. In operation, in one embodiment, transmit buffer 128-1 contains a page of complex RF data samples (received from call processing software module 114) waiting for transmission to radio head unit 104. Transmit engine 126-1 removes a page of complex data samples from the transmit buffer 128-1 and sends the data samples to DUC 122-1. In one embodiment, transmit engine 126-1 holds the page of complex data samples until time synchronizer 124-1 determines that the current time matches a start time code embedded within the page. When the two times match, transmit engine 126-1 starts transmitting the page of complex data samples to DUC 122-1.

In one embodiment, a configuration management unit 132 receives information from call processing software module 114 to reconfigure logical channel 130-1 for a new modulation protocol. A configuration management unit 132 looks up associated parameters for the modulation protocol from a table located in a memory unit 136. Through a control channel 134, configuration management unit 132 loads appropriate filter coefficients and transfer rate to DUC 122-1. In one embodiment, DUC 122-1 is adapted with a buffer memory that holds the parameters received from configuration management unit 132. In one embodiment, transmit engine 126-1 sends a synchronization signal to DUC 122-1 to load the parameters from the buffer memory into DUC 122-1's active registers. Once the parameters are loaded into the active registers, logical channel 130-1 begins operation under the modulation protocol specified by call processing software 114.

In one embodiment, radio head interface 106 is dynamically reconfigured to change the signal bandwidth allocation for forward logical channel 130-1. In operation, in one embodiment, configuration management unit 132 receives information from call processing software module 114 to reconfigure the signal bandwidth allocation for logical channel 130-1. Configuration management unit 132 looks up the associated parameters for the new signal bandwidth allocation from the table located in memory unit 136. Through control channel 134 configuration management unit 132 loads the appropriate parameters to DUC 122-1. In one embodiment, DUC 122-1 is adapted with a buffer memory which holds the parameters received from configuration management unit 132. In one embodiment, transmit engine 126-1 sends a synchronization signal to DUC 122-1 to load the parameters and sampling rates from buffer memory into DUC 122-1's active registers. Once the parameters are loaded into the active registers, logical channel 130-1 is ready to begin operation with the new signal bandwidth allocation.

Figure 1C:
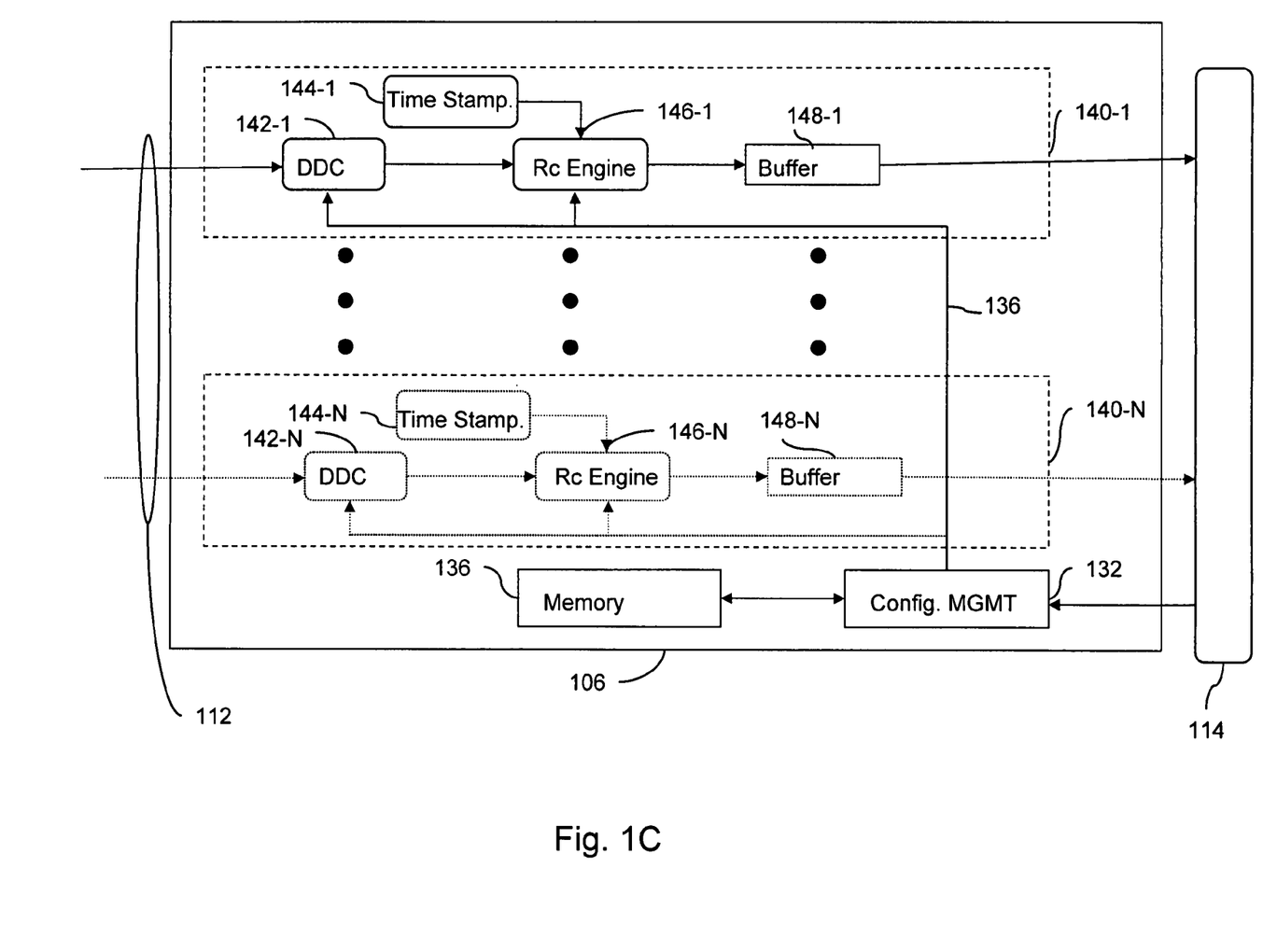

In FIG. 1C, one embodiment of the present invention for a reverse logical channel 140-1 data path is illustrated. A radio head interface 106 reverse logical channel 140-1 comprises a receiver buffer 148-1, a receive engine 146-1, a DDC 142-1 and a time stamper 144-1. In one embodiment, radio head interface card 106 comprises a plurality of N reverse logical channels 140-1 through 140-N each having receiver buffers 148-1 through 148-N, receive engines 146-1 through 146-N, DDCs 142-1 through 142-N and time stampers 144-1 through 144-N.

In one embodiment, radio head interface 106 is dynamically reconfigured to change modulation protocol for reverse logical channel 140-1. In operation, in one embodiment, receive engine 146-1 receives complex data samples from DDC 142-1 and places them into a receiver buffer 148-1. As receiver buffer 148-1 fills, it creates a page of complex data samples. Time stamper 144-1 places, in a page header, the time the first complex data sample was received from DDC 142-1. The completed page is subsequently received and processed by call processing software module 114. In one embodiment, configuration management unit 132 receives information from call processing software module 114 to reconfigure logical channel 140-1 for a new modulation protocol. A configuration management unit 132 looks up the associated parameters for the modulation protocol from the table located in memory unit 136. Through control channel 134 configuration management unit 132 loads the appropriate parameters to DDC 142-1. In one embodiment, DDC 142-1 is adapted with a buffer memory that holds the parameters received from configuration management unit 132. In one embodiment, an associated forward logical channel 130-1's transmit engine 126-1 sends a synchronization signal to DDC 142-1 to load the parameters from the buffer memory into DDC 142-1's active registers. Once the parameters are loaded into the active registers, the logical channel 140-1 is ready to begin operation under the new modulation protocol.

In one embodiment, radio head interface 106 is dynamically reconfigured to change the signal bandwidth allocation for reverse logical channel 140-1. In operation, in one embodiment, configuration management unit 132 receives information from call processing software module 114 to reconfigure the signal bandwidth allocation for logical channel 140-1. Configuration management unit 132 looks up the associated parameters for the new signal bandwidth allocation from the table located in memory unit 136. Through control channel 134 configuration management unit 132 loads the appropriate filter parameters and transfer rate to DDC 142-1. In one embodiment, DDC 142-1 is adapted with a buffer memory that holds the filter parameters and transfer rate received from configuration management unit 132. In one embodiment, an associate forward logical channel 130-1's transmit engine 126-1 sends a synchronization signal to DDC 142-1 to load the filter parameters and transfer rate from the buffer memory into DDC 142-1's active registers. Once the filter parameters and transfer rate are loaded into the active registers, logical channel 140-1 is ready to begin operation within the new signal bandwidth allocation specified by call processing software module 114.

In one embodiment of the present invention, the base station 110 determines the optimal signal bandwidth allocation for the available logical channels and dynamically reconfigures the logical channels to support changing demands for bandwidth as described in the preceding embodiments.

In one embodiment, for each logical channel, information provided to radio head interface 106 by call processing software module 114 to initiate a protocol or bandwidth change may include one or more of, but not limited to: a modulation protocol, a bandwidth allocation, RF channels, and a timing trigger designating when to perform the change.

In one embodiment, the timing trigger is a designated time based off of radio head interface 106's internal time count. When radio head interface 106's time count reaches the designated time, transmit engine 126-1 sends a signal to DUC 122-1 to load the parameters provided by configuration management unit 132. Whatever data sample is contained in transmit buffer 128-1 at that time are loaded to DUC 122-1 and transmitted in the new protocol, or within the new bandwidth, as specified by call processing software module 114. For the associated reverse logical channel 140-1, when radio head interface 106's time count reaches the designated time, transmit engine 126-1 sends a signal to DDC 142-1 to load the parameters provided by configuration management unit 132. Data samples received from radio head unit 104, processed by DDC 142-1, and received in receiving buffer 148-2 will be processed by call processing software 114 as required by the new modulation protocol, or within the new signal bandwidth allocation.

In one embodiment, the timing trigger is a designated trigger data sample that designates when to perform the change, instead of a designated time. For example, in one embodiment the designated trigger data sample is the 32 bit hex quadword DDDDDDDDh. Transmit engine 126-1 scans data pages received from transmit buffer 128-1 for a designated trigger data sample DDDDDDDDh. Upon receipt of that data sample transmit engine 126-1 sends a signal to DUC 122-1 to load the parameters provided by configuration management unit 132. Whatever data sample is contained in transmit buffer 128-1 at that time will be loaded to DUC 122-1 and transmitted in the new protocol (or within the new signal bandwidth allocation). For the associated reverse logical channel 140-1, upon receipt of the designated trigger data sample transmit engine 126-1 sends a signal to DDC 142-1 to load the parameters provided by configuration management unit 132. Data samples received from radio head unit 104, processed by DDC 142-1, and received in receiving buffer 148-2 are processed by call processing software 114 as required by the new modulation protocol (or within the new signal bandwidth allocation).

In one embodiment, configuration management unit 132 is adapted to know the different modulation protocols supported by the radio head unit 104 hardware, and the associated valid ranges of RF channels and signal bandwidths, based on the parameter table stored in memory unit 136. In one embodiment, the modulation protocols and the associated valid ranges of RF channels and signal bandwidths are loaded into memory unit 136 during the initial configuration of communications system 100. In some embodiments, when call processing software module 114 instructs radio head interface 106 to configure a logical channel for a non-supported protocol or bandwidth, radio head interface 106 generates an error condition flag to call processing software module 114. In one embodiment, when call processing software module 114 instructs radio head interface 106 to change protocol or bandwidth at an invalid designated time, radio head interface 106 generates an error condition flag to call processing software module 114. In one embodiment, radio head interface 106 is adapted to disregard instructions from call processing software module 114 that result in the generation of an error condition flag.

Figure 2:
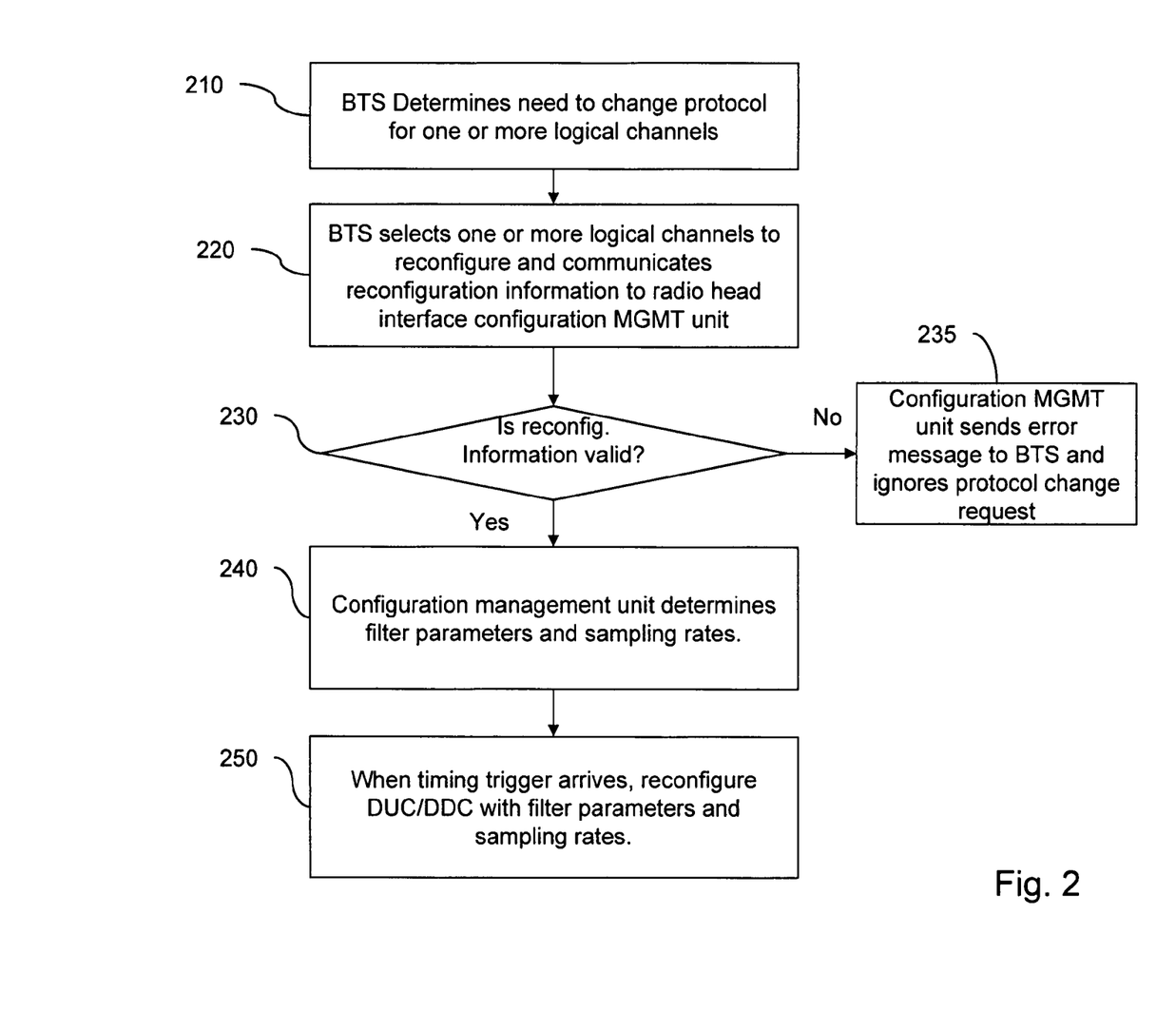
FIG. 2 is flow chart of one embodiment of dynamic protocol configuration of one embodiment of the present invention.

FIG. 2 is a flow chart of one embodiment of dynamic protocol configuration, based on the apparatus of FIGS. 1A, 1B and 1C of the present invention, shown generally at 200. A BTS determines the need to change an operating protocol of a logical channel (210). At step (220), the BTS selects the logical channel to be reconfigured for a different protocol and communicates reconfiguration information to a radio head interface. In one embodiment, reconfiguration information includes one or more of: the new protocol assignment, an RF channel assignment, and timing trigger indicating when to perform the protocol reconfiguration. In one embodiment, the timing trigger indicates a designated time based on a radio head interface internal clock. In one embodiment, the timing trigger is a specific data sample within a page of complex data samples. Proceeding to step (230), the radio head interface determines whether the reconfiguration information is valid for the radio head hardware coupled to the radio head interface. In one embodiment, radio head interface further verifies that the protocol assignment is valid. In one embodiment, radio head interface further verifies that the RF channel assignment is valid for the protocol being assigned to a logical channel. In one embodiment, the radio head interface further verifies that the timing trigger is valid, when the trigger is in the form of a designated time. At (240), a configuration management unit determines the associated DUC/DDC parameters (DUC parameters for forward direction logical channels and DDC parameters for reverse direction logical channels) and sampling rate required for newly assigned protocol. In one embodiment, the configuration management unit loads the parameters and sampling rate into DUC/DDC buffers. At (250), when the timing trigger arrives, the DUC/DDC is reconfigured with the new parameters and sampling rate.

Figure 3:
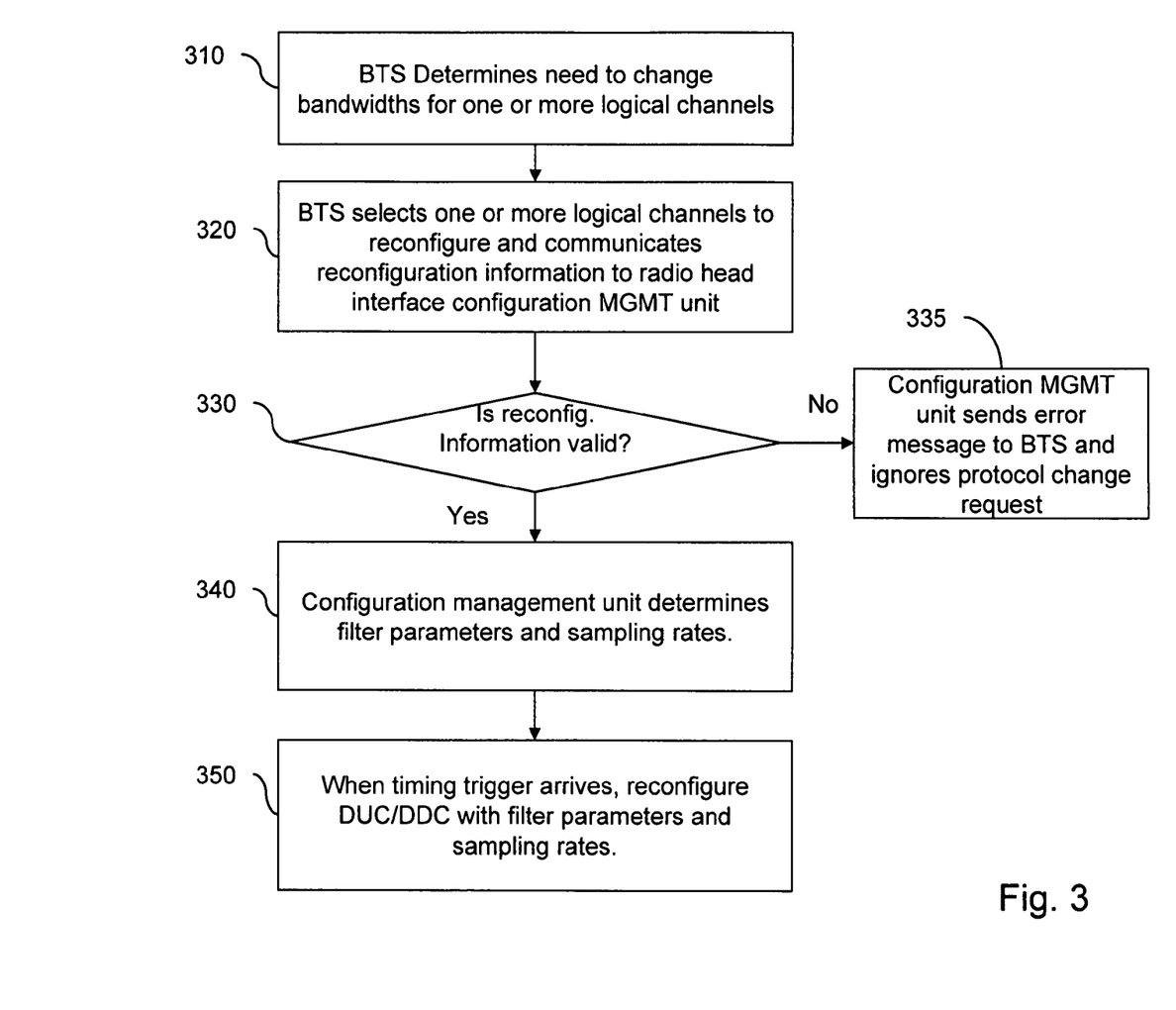
FIG. 3 is flow chart of dynamic reallocation of bandwidth of one embodiment of the present invention.

FIG. 3 is a flow chart of one embodiment of dynamic signal bandwidth allocation, based on the apparatus of FIGS. 1A, 1B and 1C, shown generally at 300. Starting at step (310), a BTS determines the need to change the signal bandwidth allocation for a logical channel. At step (320), the BTS selects the logical channel to be reconfigured and communicates reconfiguration information to the radio head interface. In one embodiment, the reconfiguration information includes one or more of: a bandwidth and a timing trigger indicating when to perform the signal bandwidth allocation change. In one embodiment, the timing trigger indicates a designated time based on a radio head interface internal clock. In one embodiment, the timing trigger is a specific data sample within a page of complex data samples. Proceeding to step (330), the radio head interface determines whether the reconfiguration information is valid for the radio head hardware coupled to the radio head interface. In one embodiment, the radio head interface further verifies that the timing trigger is valid. At (340), a configuration management unit determines the associated DUC/DDC parameters (DUC parameters for forward direction logical channels and DDC parameters for reverse direction logical channels) and sampling rate. In one embodiment, the configuration management unit loads the parameters and sampling rate into DUC/DDC buffers. At (350), when the timing trigger arrives, the DUC/DDC is reconfigured with the new parameters.

In one embodiment information regarding dynamic signal bandwidth allocation and protocol configuration is communicated from the BTS to the radio head interface configuration management unit through a data sample page header. In one embodiment, call processing software module 114 outputs to logical channel 130-1's transmit buffer 128-1 a page of complex RF data samples representing voice and data communications. Prefixed to the data samples, is a page header that in one embodiment includes one or more of, but not limited to, a start of page indicator, a protocol assignment code, a signal bandwidth indicator (BWI), signal bandwidth allocation parameters, a protocol reconfiguration indicator (PRI), protocol assignment parameters, RF frequency channel parameters, a time start code, and a timing trigger. Further details concerning the contents of a complex data sample page or information embedded within a page header are described in the '675 application herein incorporated by reference.

In one embodiment, transmit engine 126-1 removes the page header, sending only the complex data samples representing voice and data communications to DUC 122-1. Transmit engine 126-1 further evaluates the header for indicator flags. In one embodiment, when transmit engine 126-1 identifies a PRI flag, then one or more of, a protocol assignment code, a RF frequency assignment code, and a timing trigger are further read from the page header and communicated to configuration management unit 132. As described previously, configuration management unit 132 then looks up associated parameters to reconfigure DUC 122-1. In one embodiment, the page header includes reconfiguration information for associated reverse logical channel 140-1. In that case, transmit engine 126-1 communicates the reconfiguration information to configuration management unit 132 that then looks up associated parameters to reconfigure DDC 142-1.

In one embodiment, when transmit engine 126-1 identifies a BWI flag, then one or more of signal bandwidth allocation parameters and a timing trigger are further read from the page header and communicated to configuration management unit 132. As described previously, configuration management unit 132 then looks up associated parameters to reconfigure DUC 122-1. In one embodiment, the page header includes reconfiguration information for associated reverse logical channel 140-1. In that case, transmit engine 126-1 communicates the reconfiguration information to configuration management unit 132 that then looks up associated parameters to reconfigure DDC 142-1.

Several ways are available to implement the radio head interface modules, software modules (e.g. call processing software modules), and BTS elements of the current invention. These include, but are not limited to systems such as, digital computer systems, programmable controllers, digital signal processors, or field programmable gate arrays. Therefore other embodiments of the present invention are the program instructions resident on computer readable media which when implemented by such systems, enable the systems to implement embodiments of the present invention. Computer readable media include any form of computer memory, including but not limited to punch cards, magnetic disk or tape, or any other magnetic data storage system, any optical data storage system, flash ROM, non-volatile ROM, PROM, E-PROM or RAM, or any other form of permanent, semi-permanent, or temporary memory storage system or device.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communications system, comprising:
a server, including:
one or more radio head interface modules; and
a call processing software module, the one or more radio head interface modules adapted to communicate with the call processing software module;
wherein the call processing software module performs modulation and demodulation of voice and data streams using one or more air interface protocols; and
a radio head unit coupled to the radio head interface module over one or more transport mediums;
wherein the radio head unit communicates with one or more subscriber units using the one or more air interface protocols;

wherein the radio head interface module receives air interface protocol parameters from the call processing software module for one or more communication channels;

wherein the radio head interface module reconfigures itself for one or more communications channels, based on the air interface protocol parameters;

wherein air interface protocol parameters include at least one of a protocol reconfiguration indicator, modulation protocol assignment parameters, and a timing trigger;

wherein the timing trigger is a designated time; and wherein the designated time correlates to a time count internal to the radio head interface module;

wherein radio head interface module further comprises:

a global positioning system receiver, wherein the time count internal to the radio head interface module is synchronized with an output signal from the global positioning system receiver.

2. The system of claim 1, wherein the server further comprises:

one or more interface devices, wherein the one or more radio head interface modules communicate with the call processing software module over the one or more interface devices.

3. The system of claim 2, wherein the one or more interface devices includes at least one of a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface and a high speed parallel interface.

4. The system of claim 1, wherein one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

5. The system of claim 1, wherein the call processing software module communicates one or more pages of data samples with the one or more radio head interface modules, each of the one or more pages of data samples having a page header; and wherein air interface protocol parameters are contained in the page header.

6. The system of claim 1, wherein the call processing software is synchronized with an output signal from the global positioning system receiver.

7. The system of claim 1, wherein the timing trigger is a designated data sample.

8. The system of claim 1, wherein the transport mediums are one or more of optical fiber, millimeter wave, coaxial cable, and Free Space Optics (FSO).

9. A communications system, comprising:

a server, including:

one or more radio head interface modules; and a call processing software module, the one or more radio head interface modules adapted to communicate with the call processing software module;

wherein the call processing software module performs modulation and demodulation of voice and data streams using one or more air interface protocols; and a radio head unit coupled to the radio head interface module over one or more transport mediums;

wherein the radio head unit communicates with one or more subscriber units using the one or more air interface protocols;

wherein the radio head interface module receives air interface protocol parameters from the call processing software module for one or more communication channels;

wherein the radio head interface module reconfigures itself for one or more communications channels, based on the air interface protocol parameters;

wherein the radio head interface module further comprises:

a transmit buffer, the transmit buffer adapted to receive a data stream from the call processing software module and store the data stream as a page of data sample;

a transmit engine;

a digital upconverter, the transmit engine adapted to transfer the page of data samples from the transmit buffer to the digital upconverter;

a configuration management unit adapted to receive air interface protocol configuration information from the call processing software module;

a memory adapted with digital upconverter parameters;

wherein the configuration management unit is further adapted to access the memory to lookup digital upconverter parameters based on the air interface protocol configuration information; and wherein the configuration management unit is further adapted to output the digital upconverter parameters to the digital up converter;

wherein the radio head interface module further comprises:

a receive buffer;

a receive engine; and a digital downconverter;

the transmit engine adapted to transfer a data stream from the digital downconverter to the receive buffer, the receive buffer adapted to store the data stream as a page of data samples, the receive buffer further adapted to output the page of data samples to the call processing software;

the memory further adapted with digital downconverter parameters;

wherein the configuration management unit is further adapted to access the memory to lookup the digital downconverter parameters based on the air interface protocol configuration information; and wherein the configuration management unit is further adapted to output the digital downconverter parameters to the digital downconverter.

10. The system of claim 9, wherein the radio head interface module is further adapted to receive bandwidth allocation information from the call processing software module for one or more communication channels;

wherein the bandwidth allocation information comprises a timing trigger and signal bandwidth allocation parameters;

wherein the radio head interface module reconfigures itself for one or more communications channels, based on the bandwidth allocation information.

11. The system of claim 10, wherein the configuration management unit is further adapted to access the memory to lookup the associated digital upconverter parameters based on the bandwidth allocation information; and wherein the configuration management unit is further adapted to output the associated parameters to the digital up converter.

12. The system of claim 11, wherein the configuration management unit is further adapted to access the memory to lookup the associated digital downconverter parameters based on the bandwidth allocation information; and wherein the configuration management unit is further adapted to output the associated parameters to the digital downconverter.

13. A communications system, comprising:
a server, including:
one or more radio head interface modules; and
a call processing software module, the one or more radio head interface modules adapted to communicate with the call processing software module;
wherein the call processing software performs modulation and demodulation of voice and data streams using one or more air interface protocols; and
a radio head unit coupled to the radio head interface module over one or more transport mediums;
wherein the radio head unit communicates with one or more subscriber units using the one or more air interface protocols;
wherein the radio head interface module receives bandwidth allocation information from the call processing software module for one or more communication channels;
wherein the signal bandwidth allocation information comprises a timing trigger and signal bandwidth allocation parameters for one or more communication channels;
wherein the radio head interface module reconfigures itself for one or more communications channels, based on the signal bandwidth allocation informatiom;
wherein the radio head interface module further comprises:
a transmit buffer, the transmit buffer adapted to receive a data stream from the call processing software module and store the data stream as a page of data samples;
a transmit engine;
a digital upconverter, the transmit engine adapted to transfer the page of data samples from the transmit buffer to the digital upconverter;
a configuration management unit adapted to receive signal bandwidth change information from the call processing software module; and
a memory adapted with digital upconverter parameters;
wherein the configuration management unit is further adapted to access the memory to lookup the associated digital upconverter parameters based on the signal bandwidth change information;
wherein the configuration management unit is further adapted to output the associated digital upconverter parameters to the digital up converter; and
wherein the radio head interface module further comprises:
a receive buffer;
a receive engine;
a digital downeonverter; and
the transmit engine adapted to transfer a data stream from the digital downconverter to the receive buffer, the receive buffer adapted to store the data stream as a page of data samples, the receive buffer further adapted to output the page of data samples to the call processing software;
the memory adapted with digital downconverter parameters;
wherein the configuration management unit is further adapted to access the memory to lookup the associated digital downconverter parameters based on the bandwidth allocation information;
wherein the configuration management unit is further adapted to output the associated digital downconverter parameters to the digital downconverter.

14. A radio head interface module, the module comprising:
a transmit buffer, the transmit buffer adapted to receive a data stream from a call processing software module and store the data stream as a page of data samples having a page header;
a transmit engine;
a digital upconverter, the transmit engine adapted to transfer the page of data samples from the transmit buffer to the digital upconverter;
a configuration management unit adapted to receive air interface protocol configuration parameters from the call processing software module for one or more communication channels, wherein the radio head interface module reconfigures itself for one or more communications channels, based on the air interface protocol configuration parameters; and
a memory adapted with digital upconverter parameters;
wherein the configuration management unit is further adapted to access the memory to lookup associated digital upconverter parameters based on the air interface protocol configuration parameters;
wherein the configuration management unit is further adapted to output the associated digital upconverter parameters to the digital up converter;
a receive buffer;
a receive engine; and
a digital downconverter;
the receive engine adapted to transfer a data stream from the digital downconverter to the receive buffer, the receive buffer adapted to store the data stream as a page of data samples, the receive buffer further adapted to output the page of data samples to the call processing software;
the memory further adapted with digital downconverter parameters;
wherein the configuration management unit is further adapted to access the memory to lookup the associated digital downconverter parameters based on the protocol configuration parameters; and
wherein the configuration management unit is further adapted to output the associated digital downconverter parameters to the digital downconverter.

15. A radio head interface module, the module compnsing:
a transmit buffer, the transmit buffer adapted to receive a data stream from a call processing software module and store the data stream as a page of data samples having a page header;
a transmit engine;
a digital upconverter, the transmit engine adapted to transfer the page of data samples from the transmit buffer to the digital upconverter;
a configuration management unit adapted to receive signal bandwidth allocation parameters and a timing trigger from the call processing software module for one or more communication channels, wherein the radio head interface module reconfigures itself for one or more communications channels, based on the signal bandwidth allocation parameters; and
a memory adapted with digital upconverter parameters;
wherein the configuration management unit is further adapted to access the memory to lookup associated digital upconverter parameters based on the signal bandwidth allocation parameters;
wherein the configuration management unit is further adapted to output the associated digital upconverter parameters to the digital up converter;
a receive buffer;

a receive engine; and a digital downconverter;

the receive engine adapted to transfer a data stream from the digital downconverter to the receive buffer, the receive buffer adapted to store the data stream as a page of data samples, the receive buffer further adapted to output the page of data samples to the call processing software;

the memory further adapted with digital downconverter parameters;

wherein the configuration management unit is further adapted to access the memory to lookup the associated digital downconverter parameters based on the signal bandwidth allocation parameters; and wherein the configuration management unit is further adapted to output the associated digital downconverter parameters to the digital downconverter.

* * * * *

UNITED STATES PATENT AND TRADEMARK OFFICE
CERTIFICATE OF CORRECTION

PATENT NO. : 7,640,019 B2  Page 1 of 1
APPLICATION NO. : 11/094947
DATED : December 29, 2009
INVENTOR(S) : Conyers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Ninth Day of November, 2010

David J. Kappos
*Director of the United States Patent and Trademark Office*